US008504284B2

(12) United States Patent
Brülle-Drews et al.

(10) Patent No.: US 8,504,284 B2
(45) Date of Patent: Aug. 6, 2013

(54) NAVIGATION SYSTEM FOR DETERMINING AND UTILIZING MONETARY COST INFORMATION

(75) Inventors: Christian Brülle-Drews, Hamburg (DE); Hartmut Schirmer, Pinneberg (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 1398 days.

(21) Appl. No.: 10/937,998

(22) Filed: Sep. 9, 2004

(65) Prior Publication Data

US 2005/0107951 A1 May 19, 2005

(30) Foreign Application Priority Data

Sep. 9, 2003 (EP) .................................... 03019692

(51) Int. Cl.
*G01C 21/00* (2006.01)
(52) U.S. Cl.
USPC ........... 701/409; 701/400; 701/402; 701/408; 701/410; 701/411
(58) Field of Classification Search
USPC .................. 701/201, 209, 200, 202, 208, 210, 701/211, 212, 213, 207; 705/13, 414; 340/990, 340/995, 928, 923, 988; 325/384
See application file for complete search history.

(56) References Cited

U.S. PATENT DOCUMENTS

| 5,752,217 A * | 5/1998 | Ishizaki et al. ................ 701/410 |
| 5,878,368 A * | 3/1999 | DeGraaf ....................... 701/411 |
| 6,256,579 B1 * | 7/2001 | Tanimoto ....................... 701/533 |
| 6,542,815 B1 * | 4/2003 | Ishizaki et al. ................ 701/533 |
| 6,970,786 B2 * | 11/2005 | Hayama et al. ................ 701/450 |
| 2003/0110075 A1 * | 6/2003 | Shioda et al. ................... 705/13 |
| 2005/0267679 A1 * | 12/2005 | Tajima .......................... 701/209 |

FOREIGN PATENT DOCUMENTS

| EP | 0 638 887 A2 | 2/1995 |
| EP | 1 077 362 A1 | 2/2001 |

OTHER PUBLICATIONS

European Patent Office Search Report regarding Application No. EP 03 01 9692, dated Jan. 14, 2004, 8 pages.

* cited by examiner

*Primary Examiner* — Ian Jen
(74) *Attorney, Agent, or Firm* — O'Shea Getz P.C.

(57) ABSTRACT

A navigation system for a vehicle is presented that provides and utilizes monetary cost-related information. The navigation system may include a database system, calculation module, and comparison module. The database system stores path data and related monetary cost-related data, which include monetary costs that are route-depend and those that are not route-dependent. The calculation module determines routes to a destination, the monetary costs associated with the routes, and may determine the fastest, longest, and least expensive routes. The comparison module enables the determination of an optimal route based on various criteria, including monetary cost. The navigation system further includes methods for determining the monetary costs associated with a route, the travel time associated with a route, determining an optimal route, and for guiding the vehicle according to the monetary cost-related information.

15 Claims, 9 Drawing Sheets

NAVIGATION SYSTEM FOR DETERMINING AND UTILIZING MONETARY COST INFORMATION

PRIORITY CLAIM

This application claims priority based on European Patent Application No. 03019692.7, filed Sep. 9, 2003. The disclosure of the above application is incorporated herein by reference.

BACKGROUND OF THE INVENTION

1. Technical Field

This application relates to a navigation system for a vehicle. More particularly, the application relates to a navigation system that uses monetary cost-related information to determine one or more routes and/or travel times to a destination and/or to navigate the vehicle.

2. Related Art

Vehicular navigation systems generally determine the current position of the vehicle and guide the user of the vehicle to a destination according to map information stored in the navigation system's database. A navigation system may guide the user of the system to a destination by determining one or more routes to the destination. The route may include one or more paths that are defined by the map information. A path may include a road, waterway, air space or the like. If the navigation system determines multiple routes, the navigation system may allow the user to select one of the multiple routes. For example, the user may be given an option to choose the route involving the least travel time (the fastest route), the route involving the shortest travel distance (the shortest route), or perhaps a route including scenic views or points of interest for sightseeing (a scenic route). In addition, before determining the route or routes, the navigation system may also allow the user to indicate to the navigation system that the route should avoid or eliminate certain path types or actions. For example, the user may indicate that the route should avoid or eliminate path types such as, motorways, tunnels, or toll roads, or activities such as right turns or left turns.

SUMMARY

A navigation system is provided that uses monetary cost-related information to determine one or more routes to a destination, where the monetary costs and/or travel time are associated with the routes. The navigation system may also use monetary cost-related information to navigate the vehicle. Because certain paths include tolls or other charges, the monetary costs associated with a particular route may be an important factor to a user selecting a route to a destination. A user may include anyone using the navigation system. The user may be located in the vehicle, such as the vehicle operator, driver, pilot, captain, or passenger, or may be located remotely from the vehicle, such as a manager of a fleet of vehicles. For example, if a large number of vehicles need to be controlled, such as in the case of fleet management, the extra expense arising from the monetary costs associated with a particular route may be important. However, other factors, such as the travel time associated with the route may also be important.

The navigation system generally may include a database system, a calculation module, and a comparison module. The navigation system may also include a selection module, input module, display module, processing module and/or network interface module. The database system may store data containing information that may be used to create a map ("map data"). The map data may include information relating to paths and/or path sections ("path data"), which may include roads, waterways, air space and the like. In addition, the database system may store data containing monetary cost information, which includes information about the monetary costs associated with the paths. The paths and/or path sections may be selected to form a route to a destination by the calculation module. The database system may be implemented within the navigation system or implemented in a remote computer or server over a communication network accessed by a network interface module included in the navigation system.

The database system may also include a first and a second database. Although many configurations are possible, the first database may store data containing information relating to first monetary costs. First monetary costs may include monetary costs associated with a particular route or path section that do not depend on the route, but which may depend on the distance traveled, vehicle inherent costs, and other factors. The second database may store data containing information relating to second monetary costs. Second monetary costs may include those monetary costs associated with a particular route or path section that depend on the route, such as tolls and vignettes. In addition, second monetary costs may depend on user-related data, such as whether the vehicle includes a route-use device needed to use or optimize the use of a route (such as a transponder or a vignette). The database system may also store data containing information relating to total monetary costs. Total monetary costs may be associated with a particular route or path section and may include the sum of the first and second costs associated with that route or path section. The association of the monetary cost data and the path data may be established by links stored in the database system. In addition, the database system may further store geographic position data and links between the monetary cost data and the geographic position data.

In addition, to determine one or more routes to the destination, the calculation module may determine the monetary costs associated with the paths and/or path sections included in a particular route using the monetary cost data, including the first, second, and/or total monetary costs. To allow a user to select the path or path section, the monetary costs about which the users wishes to see, a selection module may be included. The calculation module may also determine the shortest route, the fastest route, and/or the least expensive route, and the various monetary costs associated with a route.

The comparison module may enable the determination of an optimum route. The comparison module may compare the travel times and monetary costs associated with the shortest route, the fastest route, and the least expensive route. By producing various ratios of the travel times and monetary costs associated with the shortest, fastest, and least expensive route, a route optimized according to travel time or monetary costs may be determined.

To guide a vehicle to a destination, the navigation system may include methods for determining the monetary costs associated with one or more paths, path sections or routes. These methods generally include providing map data and monetary cost data, enabling selection of one or more paths, path sections, or routes and determining the first and second monetary costs associated with the paths, path sections, or routes.

The navigation system may include a method for determining the monetary costs associated with a route, taking into consideration user-related information. For example, the method may include determining whether the vehicle includes any route-use devices needed to use or improve the use of the route. If the vehicle does not include the needed route-use device, the monetary costs associated with obtaining the needed route-use device may be included in the second monetary costs.

The navigation system may include a method for determining a route to a destination that avoids routes with associated second monetary costs, if possible. The navigation system may also include methods for determining an optimal route. The method for determining an optimal route may include determining the fastest, shortest, and least expensive routes to a common destination, and the monetary costs associated with each of these routes. The method for determining an optimal route may further include determining ratios of the monetary costs and travel times associated with the fastest, shortest, and least expensive routes to enable a route optimized according to travel time or monetary cost to be determined.

The navigation system may include a method for determining the travel time of a vehicle along a route to a destination. The method may include determining the travel times that arise in connection with any second monetary costs associated with the route. For example, the method may include determining whether the vehicle includes any route-use devices needed to use or improve the use of the route, and if the vehicle does not include the needed route-use devices, the travel time may include the time required to obtain the needed route-use devices.

The navigation system may include a method that uses cost-related information to navigate a vehicle along a route. For example, if the route has an associated second monetary cost, such as a tollbooth, the method may determine whether the vehicle includes the route-use device needed to use the automatic payment lanes of the tollbooth. The method may include guiding the vehicle into the automatic payment lanes of the tollbooth, if the vehicle includes the needed route-use device, and may include guiding the vehicle into lanes allowing manual payment if the vehicle does not include the needed route-use device.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
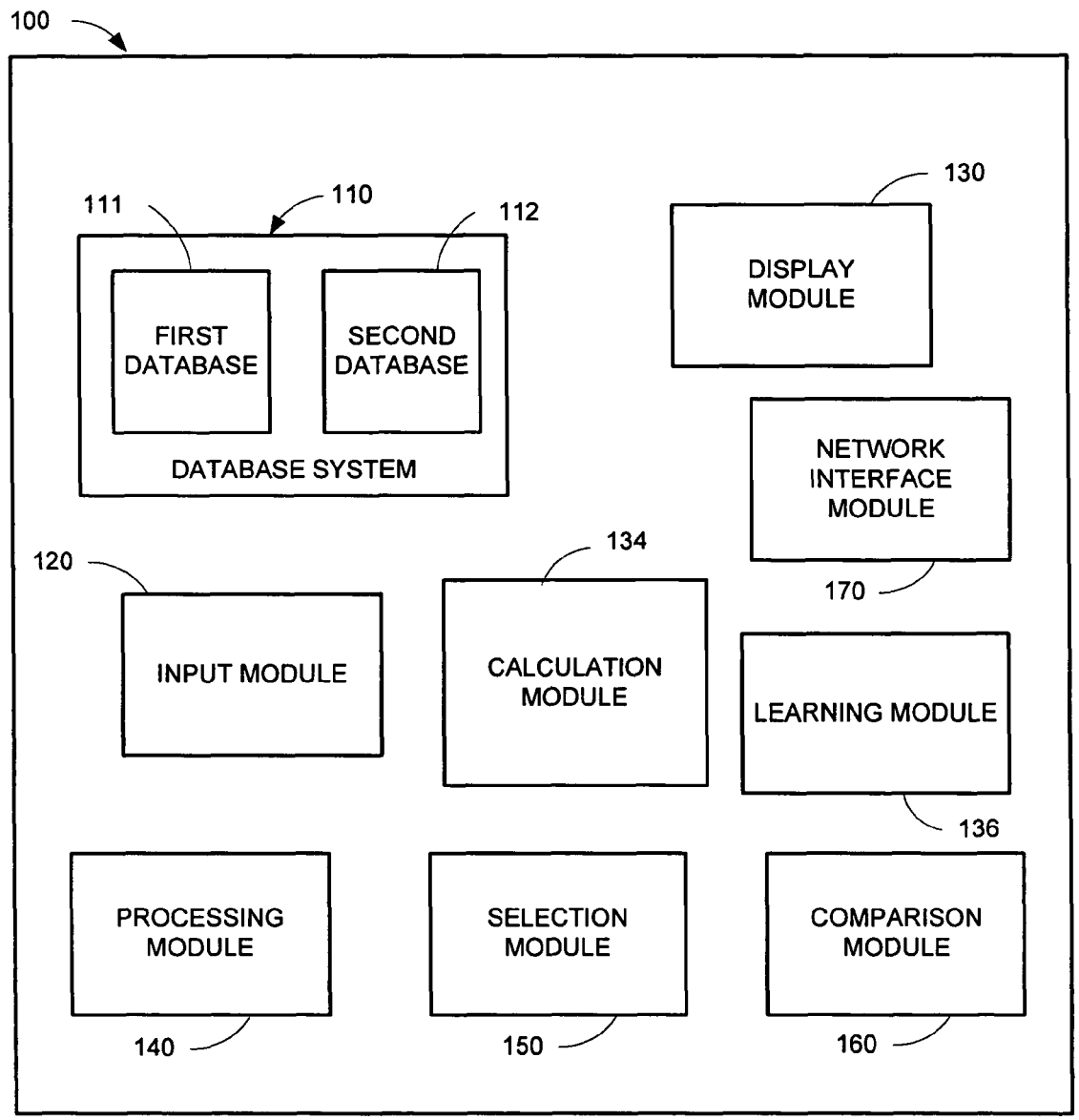
FIG. 1 is a block diagram of a navigation system.

FIG. 1 shows a navigation system 100 that may be installed in a vehicle. Vehicles may include automobiles, trucks, lorries, farming equipment, mining equipment, golf carts and mobile robots. The navigation system 100 may be used for plotting waterways for ships, flight paths for planes, or with an autopilot system of an airplane or spaceship. The navigation system 100 may include a database system 110 that stores data containing map information that may be used to generate a map for the navigation system ("map data"), and information relating to the monetary costs associated with the paths and path sections used to generate the map ("monetary cost data"). The database system may further store other data containing any other items of information that may be used by the navigation system, such as information about points of interest.

The map data may be represented by one or more paths or path sections. The term "path sections" refers to paths, path sections, or a combination of paths and/or path sections. Path sections may be represented in different mathematical forms, such as vectors indicating the length and direction of the path sections, clothoids, or any other representation of map data. Information relating to the monetary costs associated with a particular path section may be linked to that particular path section. Thus, for every path section with associated monetary costs, a link may be stored in the database system that links the relevant monetary costs to the path section. Path sections may be combined to form a route on the map to an identified location ("destination").

The database system 110 may be configured in several different ways. For example, the database system 100 may include a first database 111, which stores the map data, and may include any kind of format suitable for generating a map. If the map data is represented as a series of path sections, the first database 111 may store the path sections, and may also include geographical position data for the path sections. Further, the first database 111 may also store the monetary cost data, and links between the monetary cost data and the path sections. The links may allow the monetary costs associated with a particular route to be determined by adding the monetary costs associated with each of the path sections that form the route. If the first database 111 does not store the monetary cost data, the map data may include a link to the second (or other) database for those path sections with an associated monetary cost. The information stored in the first database 111 may be entered using an input module 120 or determined by the calculation module 134. The database system 110 may also include a second database 112. If the first database 111 does not store the monetary cost data, the second database 112 may store the monetary cost data. The second database 112 may also store geographical position data, and a link between the monetary cost data and at least one item of geographical position data.

The monetary cost data may include information relating to one or more first monetary costs and/or second monetary costs. First monetary costs may include those monetary costs that, in general, do not depend on the route. The first monetary costs-may depend on the distance traveled. In addition, the first monetary costs may depend on the type of vehicle used (such as passenger car, truck, motorcycle, plane, and boat), inherent characteristics of the vehicle (such as fuel consumption, value of the vehicle, length and weight of the vehicle, number of passengers), insurance premiums, and the like (collectively "vehicle inherent monetary costs"). The first monetary costs may also depend on other factors that do not depend on the route such as the types of path sections included in the route (such as, highway, country road, city street, air space, or waterway). Further, if the route includes a road, the first monetary costs may also depend on whether the road is paved or not.

The first monetary costs may alternately or additionally depend on time. For example, when a vehicle is transporting goods, monetary costs that accumulate over time may be incurred. If, for instance, a user has to wait in order to use a certain part of a route (such as, waiting for a ferryboat), the first monetary costs may also depend on the wait time. Therefore, time tables (such as those for ferryboats and trains) may be provided in order to determine to wait times and the associated time-related monetary costs. Furthermore, the first monetary costs may include monetary costs for delayed arrival at the destination.

The second monetary costs may include those monetary costs that generally depend on the route and, therefore, may include monetary costs such as tolls, monetary costs for vignettes, monetary costs for ferryboats, tunnel fees, bridge tolls, tolls per distance, and fees for trains. Some of these second monetary costs, such as the tolls per distance, may additionally depend on the distance traveled. Tolls per distance include toll systems that charge vehicles based on the distance traveled (such as that used in Italy). Some of the second monetary costs, such as monetary costs for vignettes, may also depend on time. The term "vignette" is used to describe the situation in which a lump sum is paid for the right to use a particular path for a specified time period, such as several months or one year. Vignettes are currently used, for example, in Austria and Switzerland, for the use of highways. The monetary costs associated with vignettes do not depend on the distance traveled because a lump sum is paid.

The database system 110 may be included in the navigation system 100. However, the database system 110 or portions of the database system 110, such as the portion storing the monetary cost data, may additionally, or alternatively be provided on a server, computer and/or database, any of which may be accessible via a communication network. The communication network may include a wide-area network (WAN) or a wireless local area network (WLAN). For example, the communication network may include a TCP/IP-based communication network such as the Internet. Thus, the navigation system 100 may include a network interface module 170, which may be in communication with the communication network. The computer, server, and/or database storing the monetary cost data may be accessed by the navigation system 100 using the network interface module 170, and may be regularly updated to include all recent monetary costs for tolls, vignettes, ferryboats, tunnel fees, monetary costs for trains, and the like. This allows the updated monetary cost information to be used to determine or re-determine the monetary costs, even when the monetary costs are changing rapidly.

The navigation system 100 may include a processing unit 140 for processing the data, including the map data. In addition or alternately, the navigation system 100 may include a calculation module 134 for determining one or more routes to a destination, the distance to the destination associated with each route, and the first, second, and/or total monetary costs associated with each route. The calculation module 134 may determine the first, second, and/or total monetary costs for a particular path section when that particular path section is included as part of a route. However, the user of the navigation system 100 may only be interested in the second monetary costs associated with a particular route. This may be the case, if, for example, the user does not pay the fuel monetary costs for, or does not own the vehicle the user is using.

The user also may be interested only in the first monetary costs, which generally depend on the distance traveled. The first monetary costs may be determined by the calculation module 134 according to a value of the vehicle's inherent monetary costs per distance, which is multiplied by the distance of the route. The vehicle's inherent monetary costs may include a fixed value or be determined in a learning module of the navigation system.

The navigation system 100 may include a learning module 136 that determines the vehicle inherent monetary costs. For example, the learning module 136 may determine future fuel consumption by taking into account the manner in which the vehicle has been operated and the vehicle's prior fuel consumption. Alternately or additionally, the learning module 136 may take into account the path types included in the route when determining vehicle inherent monetary costs. For example, fuel consumption may depend on the path types, such as whether a path is an inclined path.

The navigation system 100 also may include a comparison module 160 that compares the monetary costs associated with each route. A selection module 150 for selecting one of the routes also may be included. If the calculation module 134 determines multiple routes to the same destination, the user may use the selection module 150 to select a particular route based on a variety of criteria, including monetary cost. For example, the selection module 150 may allow the user to select the shortest, cheapest, fastest, or other route. The navigation system 100 may also include a display module 130 that communicates the map, routes, and/or monetary costs arising in connection with a path section or route to a user, or any combination or subset, to a user or other system.

The different modules of the navigation system 100 need not to be incorporated in a single device. The database system 110 may be included in a server, and the selection module 150 may be included in another location, such as, the location in which fleet management takes place. When the monetary cost information is provided on a server, the monetary cost information may be updated more easily.

Figure 2:
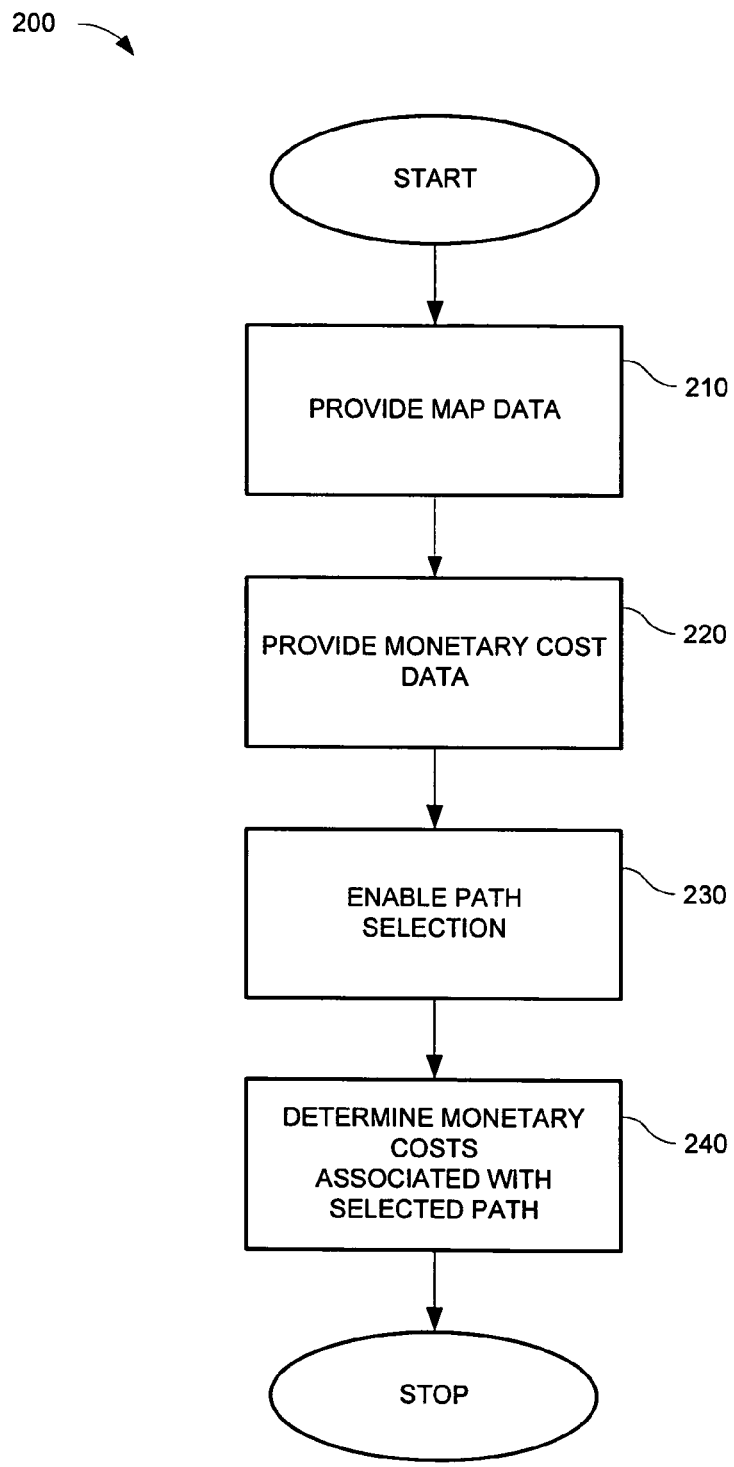
FIG. 2 is a flow chart of a method for determining monetary costs associated with a path section.

In FIG. 2 a method for determining the monetary costs associated with a path section 200 is shown. As shown, map data may be provided, 210, from which a map may be generated. As shown in FIG. 1, map data may be stored in the database system 110 of the navigation system 100. As shown in FIG. 2, monetary cost data may be provided that contains information regarding the monetary costs associated with the path sections in the map. The monetary cost data may also be stored in the database system (see FIG. 1, reference number 110). The user may then be enabled to select a path selection 230, which may be a part of a route to a destination. The monetary costs associated with the path section may then be determined 240. In this way, the user may be provided information that may be considered when determining or selecting a route to a destination.

Figure 3:
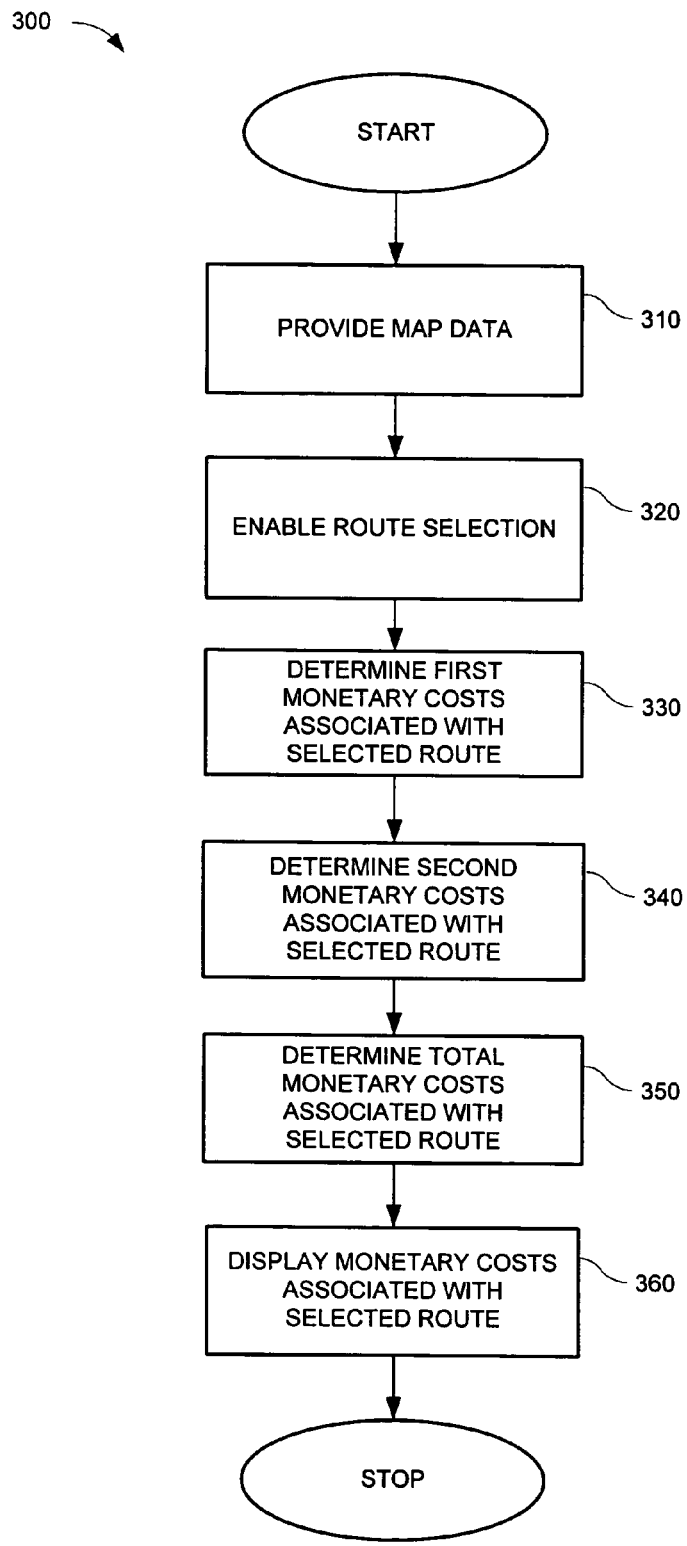
FIG. 3 is a flowchart of a method for determining monetary costs associated with a route.

In FIG. 3, a method for determining monetary costs associated with a route 300 is shown. Initially, map data may be provided for generating a map for the navigation system 310. Then, because the navigation system may have determined multiple routes, the user may be enabled to select a route to the destination 320. For example, a selection module (see FIG. 1, reference number 150) may be provided to enable the user to select a route. After the route is selected, the first monetary costs arising in connection with the selected route may be determined 330. The first monetary costs generally depend on the distance traveled along the selected route. The second monetary costs arising in connection with the selected route may alternately or additionally be determined 340. The second monetary costs generally depend on the selected route, and may include monetary costs for tolls, vignettes, ferryboats, tunnels, tolls per distance, and/or tolls for trains.

The total monetary costs associated with the selected route may be determined 350 by summing the first and the second monetary costs. Subsequently, the first, second, and/or the total monetary costs may be displayed, for example using a display module, such as that shown in FIG. 1. These monetary costs may also be transmitted to a remote server or computer via, for example, the network interface module shown in FIG. 1. The monetary costs may be transmitted to a third person who may be responsible for deciding which route or type of route the vehicle is to take, such as a fleet manager.

Figure 4:
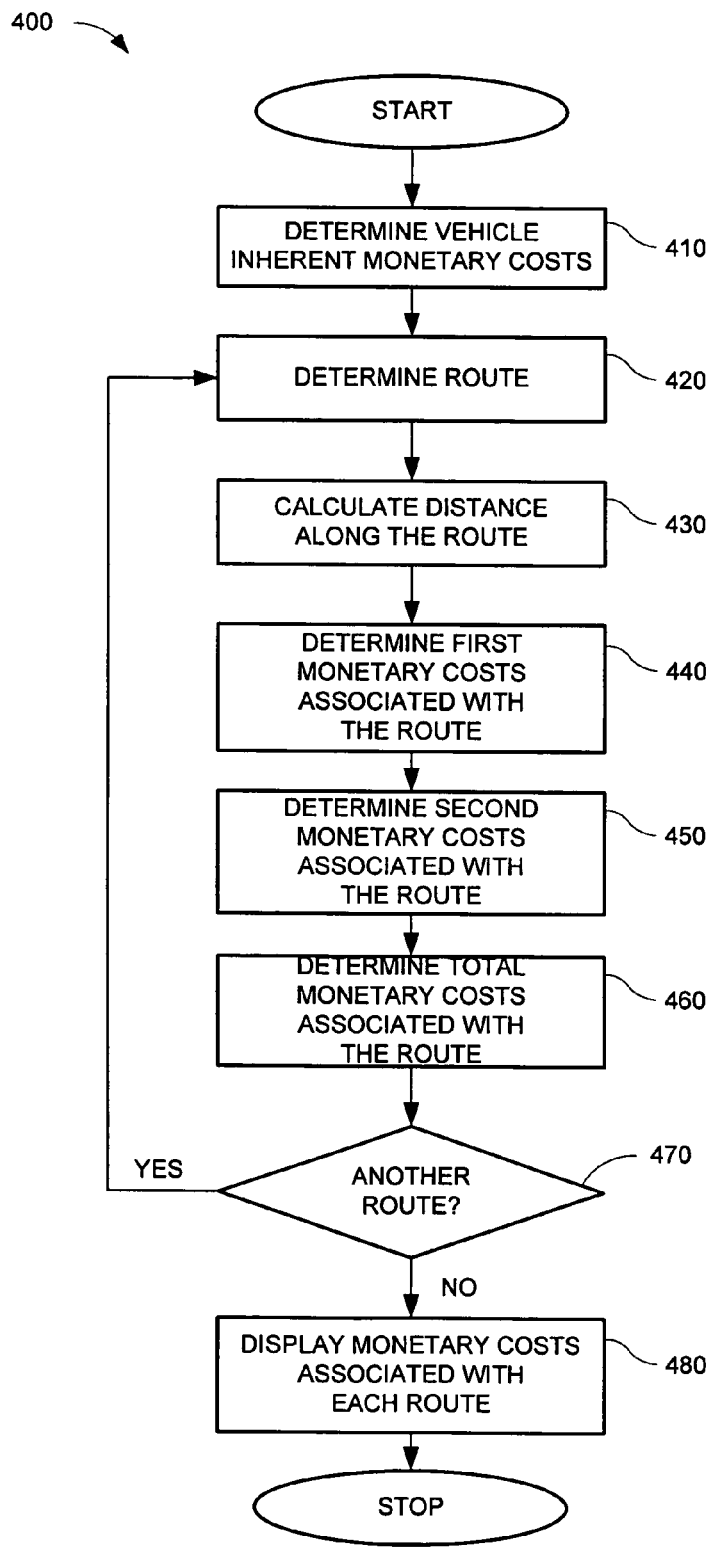
FIG. 4 is a flowchart of a method for determining monetary costs associated with multiple routes to the same destination.

A method for determining the monetary costs associated with multiple routes to the same destination is shown in FIG. 4. First, second, and total monetary costs may be determined 400. To determine the first monetary costs, the vehicle inherent monetary costs per distance unit may be determined 410. The vehicle-inherent monetary costs over a specified distance (for example, 100 kilometers) may be stored in a database system (see FIG. 1, reference number 110), communicated with the navigation system by a user, or determined by taking into account vehicular characteristics. The vehicle inherent monetary costs may also be determined by considering the geography of the potential route. The route to a destination may then be determined 420. The distance to the destination using the determined route may be determined 430. Then, the first monetary costs may be determined 440 by multiplying the vehicle-inherent monetary costs per distance unit with the distance determined.

The second monetary costs associated with the route, such as those due to tolls, vignettes and/or other monetary costs, may be determined 450. The total monetary costs may be determined 460 by summing the first and second monetary costs. Then, a determination is made as to whether another route to the destination should be determined 470. If it is determined that another route should be determined, another route is determined in step 420 and the method 400 repeats as appropriated, until it is determined that no other route should be determined. If is determined that no other route should be determined, the monetary costs associated with the route or routes may be displayed or conveyed to the user 480. Alternatively, the monetary costs may be displayed or conveyed at any time.

Figure 5:
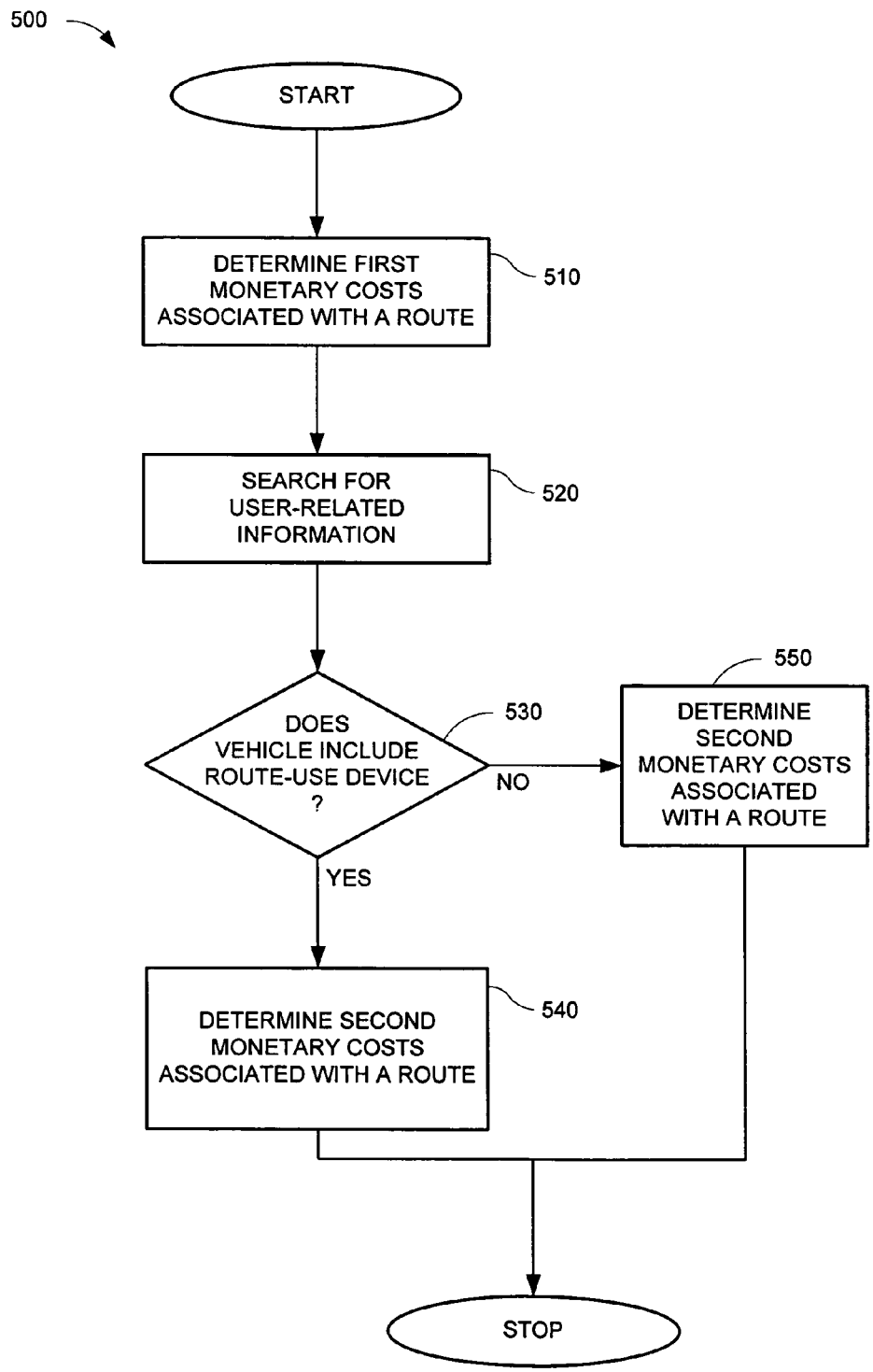
FIG. 5 is a flowchart of a method for determining monetary costs dependent on user-related information.

In FIG. 5, a method for determining the monetary costs dependent on user-related information 500 is shown. Thus, data containing user-related information ("user-related data") may be taken into account in the determination of the second monetary costs. The method 500 may include determining the first monetary costs 510. The first monetary costs may be determined as described in connection with FIG. 4. A search may then be performed for user-related data 520. User-related data may include data that indicates whether the vehicle or the user currently has a device that is needed to either use or optimize use of the route (the "route-use device"). The route-use device may include any device that helps to avoid monetary costs, which normally have to be paid when using a particular path, but which do not have to be paid when the route-use device is with the vehicle. For example, the route-use device may include a vignette. If the vehicle already includes a vignette for the route or path section in the route, the user does not incur monetary costs in obtaining the vignette. The route-use device may include an automatic device, such as a transponder, which works with an automatic tollbooth to automatically charge a toll to the owner of the vehicle when the vehicle passes such a tollbooth.

Whether a route-use device was found may be determined 530. If the vehicle already includes the appropriate route-use device, the second monetary costs may be determined 540. If the vehicle does not have the appropriate route-use device, the second monetary costs may be determined in 550. However, the second monetary costs determined in step 550 may differ from those determined in step 540, because the second monetary costs determined in step 550 include the monetary costs associated with obtaining the route-use device. In addition, the total monetary costs may be determined and the first, second, and/or total monetary costs may be communicated to a user. With this method 500, user-related information may be considered when determining the second monetary costs. This provides an advantage because the user may, for example, use automatic payment lanes at a tollbooth, which are generally faster than the lanes provided for manual payment.

Figure 6:
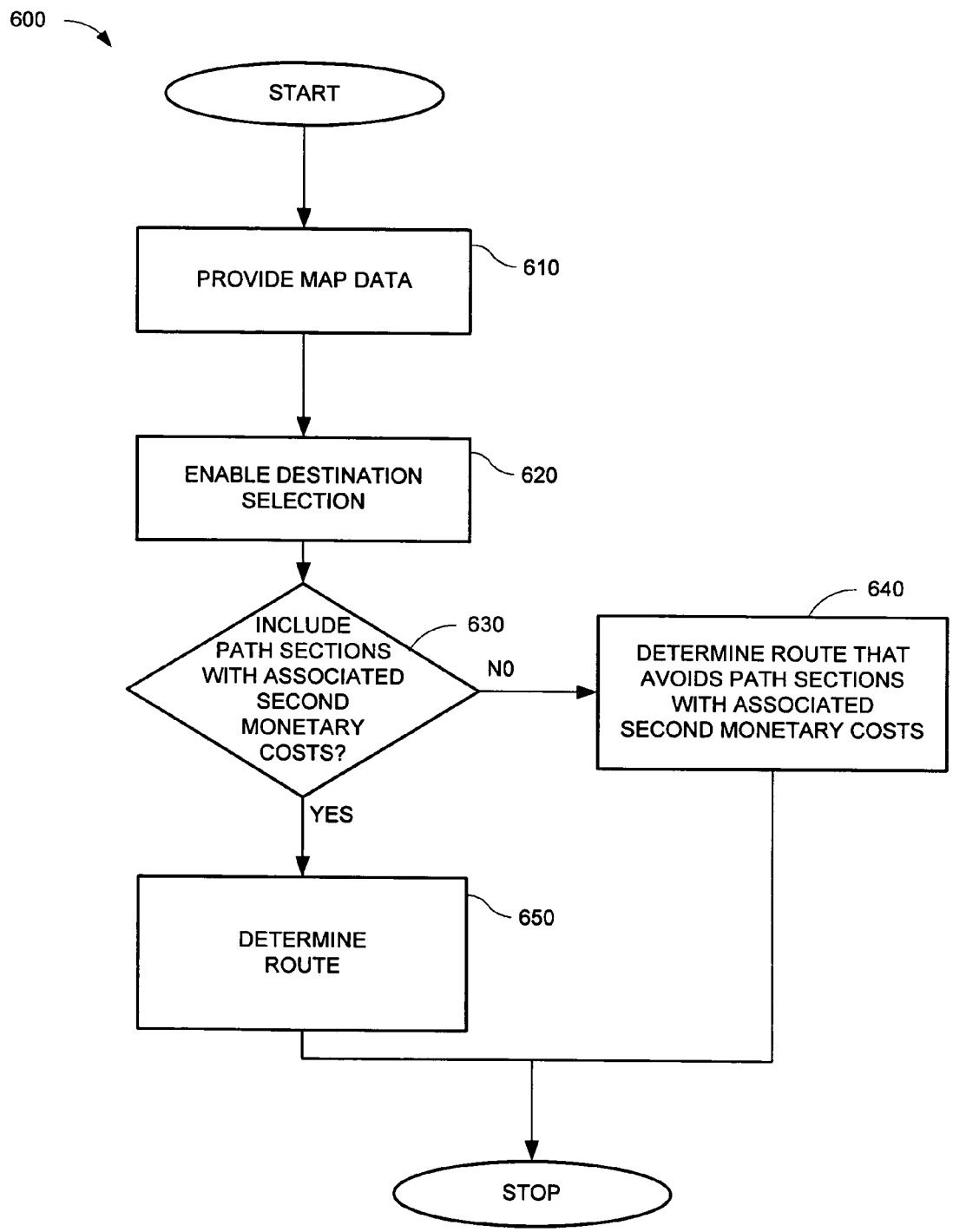
FIG. 6 is a flowchart of a method for determining a route that avoids second monetary costs.

In FIG. 6 a method for determining a route that avoids second monetary costs 600 is shown. The method 600 may be used when, for example, a user is not concerned about the first monetary costs, because the user does not pay for first monetary costs, such as fuel, or does not own the vehicle. In this example, the user may only be concerned with the second monetary costs. The method 600 may include providing the map data 610 to generate a map and a destination may be selected 620. For example, the destination may be selected by the user. The method 600 may then determine whether to find routes with which second monetary costs are associated 630. This may be determined by soliciting a response from the user. If it is determined that the routes with associated second monetary costs are to be excluded, the navigation system (see FIG. 1) may determine a route that does not include any path sections with associated second monetary costs 640, if possible. In contrast, if it is determined that routes with associated second routes do not need to be excluded, the navigation system may determine a route 650, which may or may not include path sections with associated second monetary costs. The routes determined at steps 640 or 650 may differ, depending on whether the route determined in step 650 includes path sections with which second monetary costs are associated. To determine the second monetary costs in step 640 and 650, the steps discussed in connection with FIG. 5 may also be incorporated.

Figure 7:
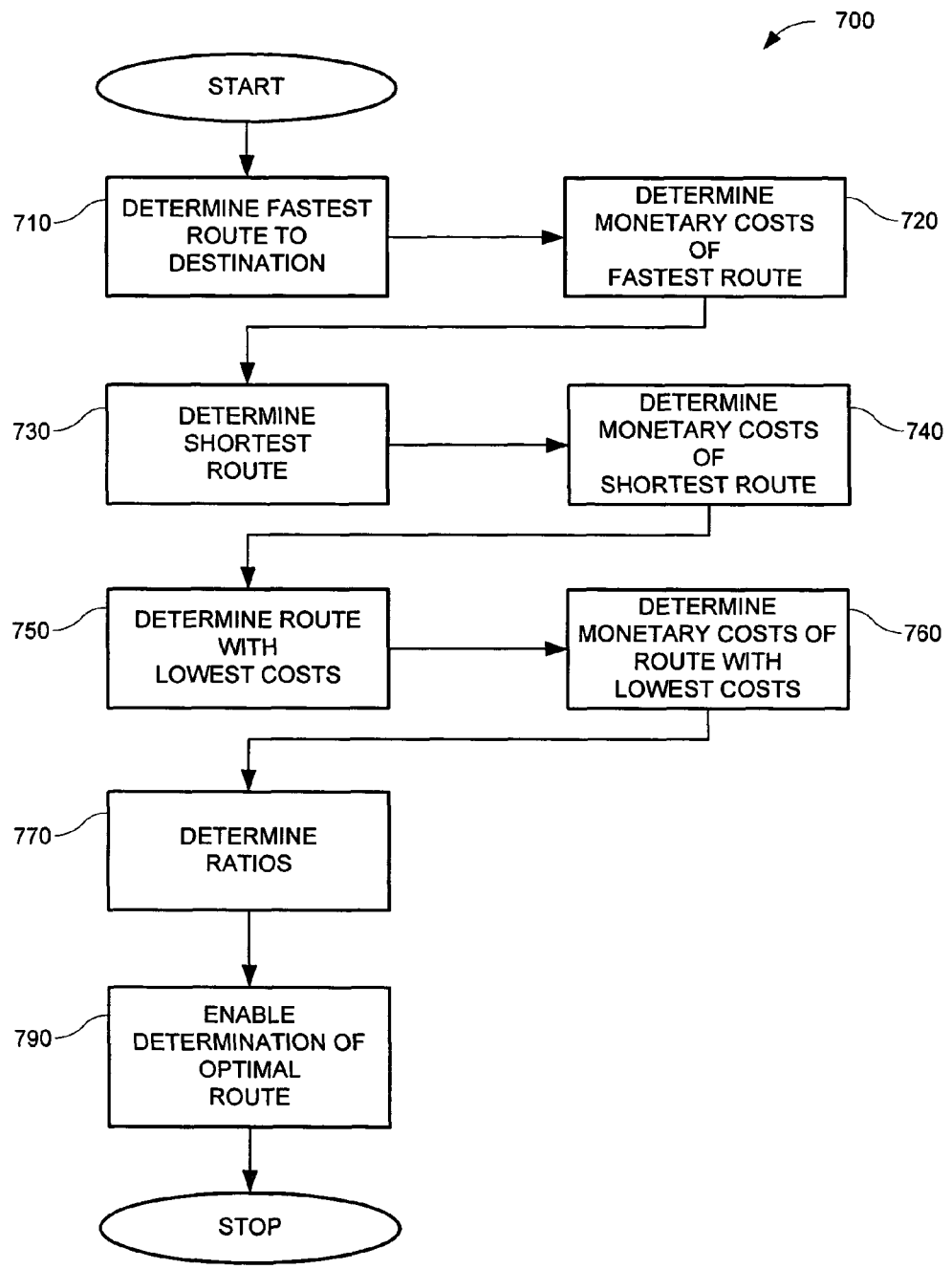
FIG. 7 is a flowchart of a method for determining an optimal route.

In FIG. 7 a method for determining an optimal route 700 to a destination is shown. After a destination has been determined, the fastest route to that destination may be determined 710. Then, the monetary costs of the fastest route may be determined 720. The monetary costs may include the first monetary costs, second monetary costs, and/or the total monetary costs. The shortest route also may be determined 730 by using the distance as a parameter for determining the route, and the monetary costs associated with the shortest route may then be determined 740. The route having the lowest monetary costs also may be determined 750. The monetary costs associated with the route having the lowest monetary costs may then be determined 760. Steps 710 through 760 may be accomplished according to known methods. The method 700 may include determining ratios 770. For example, a ratio of the fastest route to the shortest route, the fastest route to the route with the lowest monetary costs, and the shortest route to the route with the lowest monetary costs may be determined. The ratios may also include ratios of the monetary costs associated with the fastest, shortest, and least expensive routes. Determination of the optimal route may be enabled 790 by presenting the ratios to the user, remote server or computer, or other components of the navigation system.

In one example, the fastest route to a destination is determined to include a highway that has a travel time of about one hour, and associated second monetary costs. The shortest distance route involves a longer travel time, and is less expensive than the fastest route. In addition, the least expensive route is 10% cheaper than the fastest route, but includes a travel time of about two hours. This example shows that it may be better to choose the fastest route, even though it is 10% more expensive than the least expensive route, because the least expensive route includes a travel time twice that of the fastest route. Therefore, an optimal route may be determined 790 by comparing the different ratios based on travel time and monetary cost.

The factors used to determine the optimal route, including the fastest route, shortest route or route with the lowest monetary costs, may be given different weighting factors, to allow a user to assign a relevant importance level to the factors. For example, the method shown in FIG. 7 is used by a traveling salesperson. If the salesperson has appointments at different locations at different times, he may optimize the route from one destination to the other depending on the time he wants to spend between the different appointments. In another example, the method for determining the optimal route is used to manage just-in-time delivery for delivering goods to a customer. In a monetary cost-sensitive industry, such as the automobile industry, transportation monetary costs are an important factor in determining whether a competitive price may be achieved. Therefore, if the user knows that the goods to be transported need to be delivered to the customer at a certain time, the user may optimize the route in terms of time and monetary cost.

Figure 8:
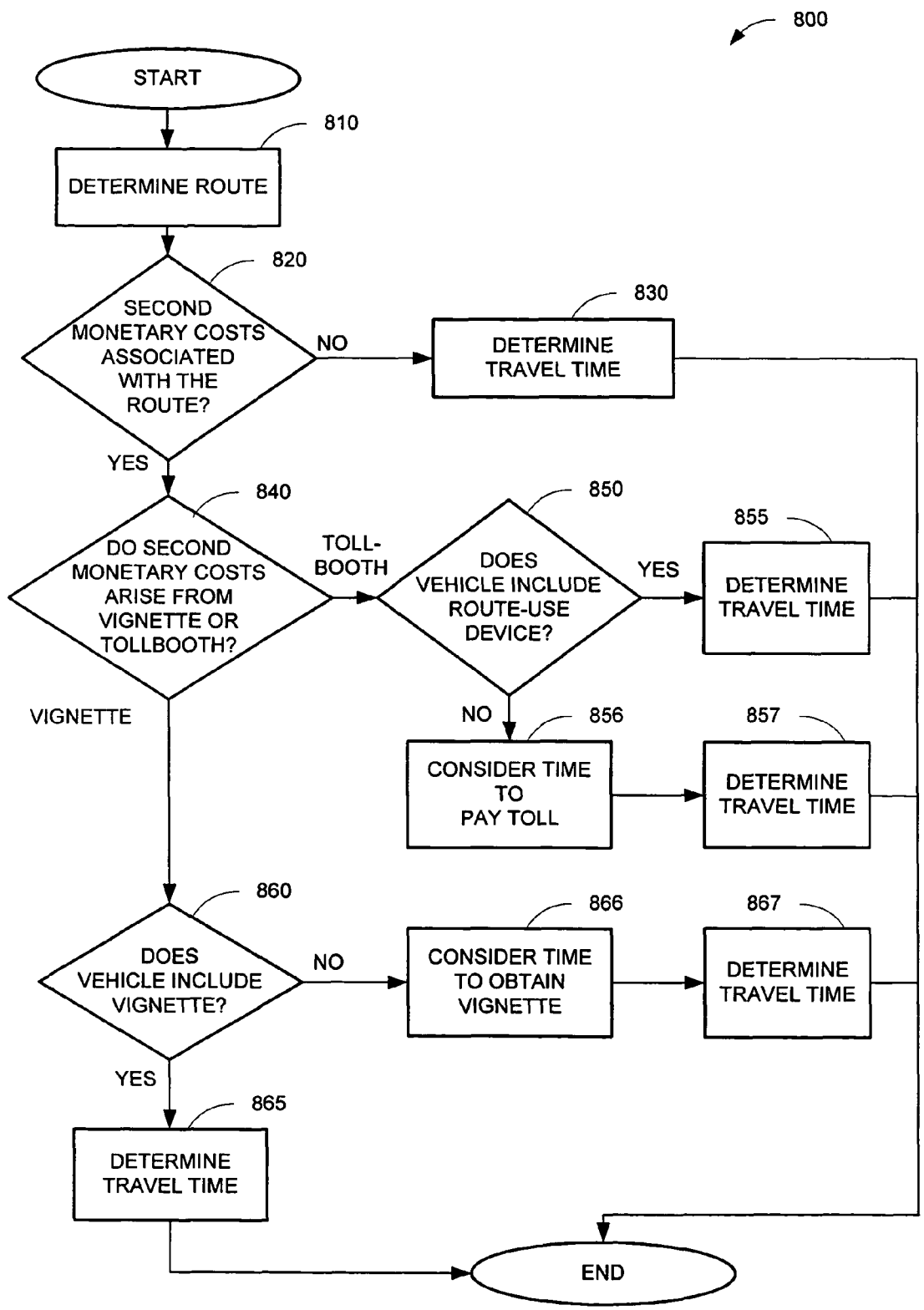
FIG. 8 is a flowchart of a method for determining travel time arising in connection with second monetary costs.

In FIG. 8, a method for determining the travel time that arises in connection with the second monetary costs 800 is shown. The method 800 may include determining a route to a destination 810, and determining whether there are any second monetary costs associated with the determined route 820. If there are no second monetary costs associated with the route, the travel time may be determined according to known methods 830. For example, when determining the travel time 830, traffic information received by the navigation system may be considered. In contrast, if there are second monetary costs associated with the route, it may then be determined whether the second monetary costs arise in connection with a vignette system or a tollbooth 840. If the second monetary costs arise in connection with a tollbooth, a determination is made regarding whether the vehicle includes a route-use device for paying the second monetary costs. This route-use device may include a transponder that identifies the vehicle and be used at tollbooths equipped with transponder systems. When the vehicle passes a tollbooth, the transponder system installed at the tollbooth receives a signal from the transponder in the vehicle. This signal identifies the vehicle by, for example, an identification number. The transponder system will then charge the owner of the vehicle a toll for use of the associated path section. Systems other than a transponder system, such as a video toll system may be used. In a video toll system, the toll booth includes a video camera or other such device, which records the license plate of a passing vehicle. The video system then charges the person to whom the license plate is registered a toll for use of the associated path section.

If it is determined that the vehicle does not include a route-use device, the travel time may be determined 855 by taking into account the fact that the user needs less time to pass the tollbooth than would be needed without the route-use device. If it is determined that the user does not have a route-use device, the time spent at the tollbooth waiting and paying the toll may be considered 856. The travel time may then be determined 857. In general, the time determined in step 857 may be longer than that determined in step 855, because use of the route-use device generally shortens the time needed to pass through a tollbooth.

In contrast, if it is determined in step 840 that the route includes a vignette system, the method may include determining whether the vehicle already has the appropriate vignette 860. If the vehicle already has the appropriate vignette, the travel time may be determined 865 by taking into account the fact that no time is needed to obtain a vignette. If, however, the vehicle does not have the appropriate vignette, the additional time needed to obtain the vignette is taken into account 866. This additional time may include the time needed to stop the vehicle and obtain the vignette. Considering this additional time, the travel time may be determined 867. In general, the travel time determined at step 865 is shorter than that determined at step 867. Thus, the estimation of the travel time to a destination is improved because the travel time arising in connection with the second monetary costs is taken into account.

Figure 9:
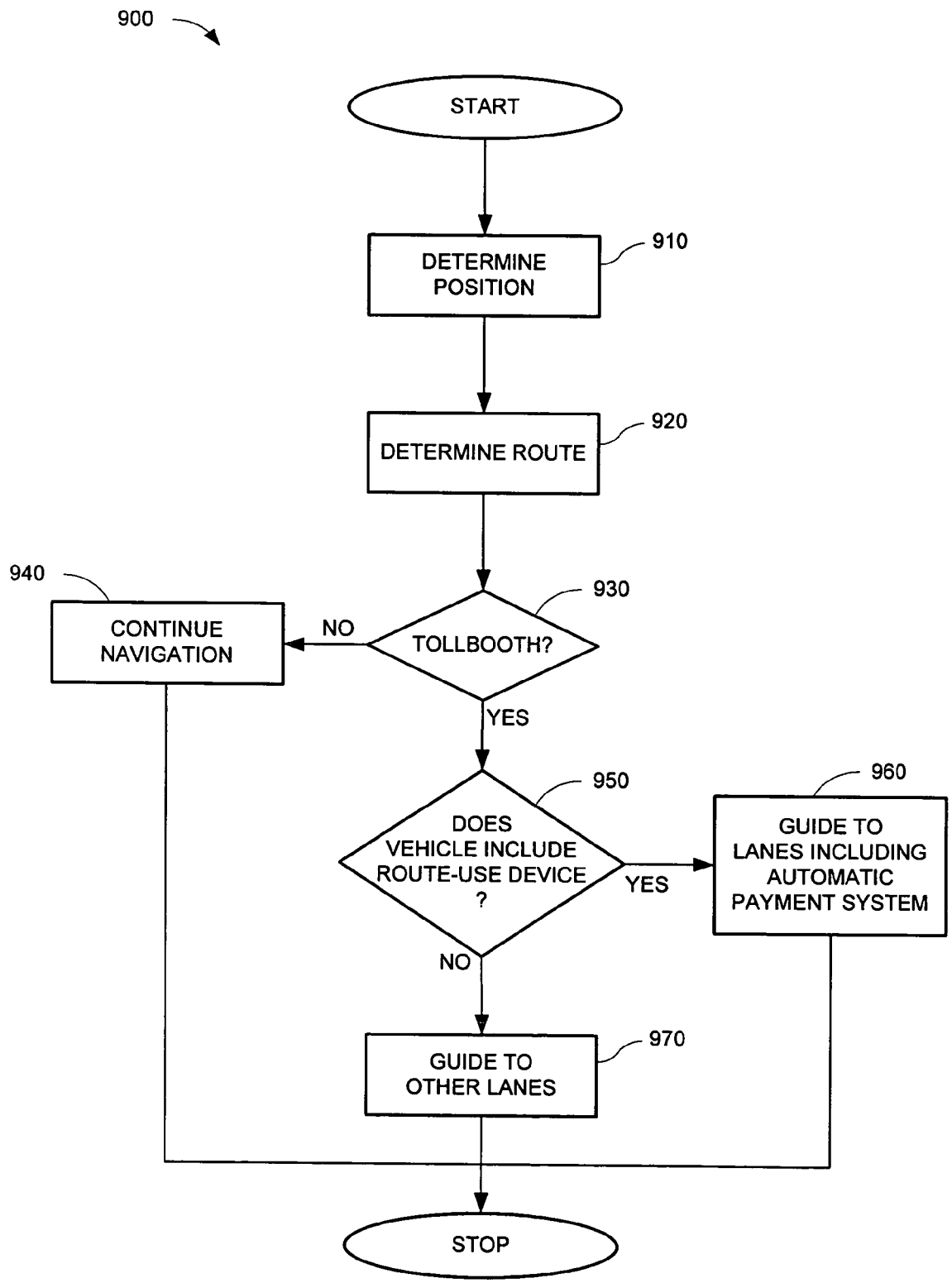
FIG. 9 is a flowchart of a method for navigating a vehicle according to monetary cost information.

In FIG. 9, a method for navigating a vehicle according to the monetary cost information 900 is shown. The method 900 may include determining the position of the vehicle 910 using the navigation system. For example, the position may be determined 910 by a global positioning satellite ("GPS") system or other system. Then, the route to a destination may be determined 920. Whether the determined route includes a tollbooth 930 also may be determined. If the route does not include a tollbooth, navigation continues 940 and no special advice is given to the user. If, however, it is determined that the route does include a tollbooth, a determination is made as to whether the vehicle has the appropriate route-use device 930. In general, the method assumes that the tollbooth includes lanes equipped with an automatic payment system, such as transponder system, which are reserved for vehicles that include a payment device. Therefore, if the vehicle or the user has the appropriate route-use device, the navigation system may guide the user to the lanes equipped with an automatic payment system 960. However, if the user and the vehicle do not have the appropriate route-use device, the navigation system will guide the user to other lanes 970 in which the user may pay the toll manually.

Implementations of the methods described in this document include computer readable software code. These methods may be implemented together or independently. Such code may be stored on a processor, a memory device or on any other computer readable storage medium. Alternatively, the software code may be encoded in a computer readable electromagnetic signal. The code may be object code or any other code describing or controlling the functionality described in this application. The computer readable storage medium may be a magnetic storage disk such as a floppy disk, an optical disk such as a CD-ROM, semiconductor memory or any other physical object storing program code or associated data.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A navigation system for guiding a vehicle, comprising:
a database system;

data stored in the database system and including path data, monetary cost data, and a plurality of links;

where the path data relates to a plurality of path sections, and a link of the plurality of links connects each path section of the path data to its corresponding monetary cost data, where the monetary cost data includes a determined amount of monetary costs associated with each of the path sections; and a selection module configured to enable selection of at least one of the plurality of path sections to form a route to a destination depending on the determined amount of monetary costs for each determined route.

2. The navigation system of claim 1, where the database system includes a first database configured to store the path data.

3. The navigation system of claim 1, where the database system includes a second database configured to store the monetary cost data.

4. The navigation system of claim 1, where the data further includes geographic position data and a link between the monetary cost data and the geographical position data.

5. The navigation system of claim 1, where the monetary cost data includes a first monetary cost that depends on a traveled distance.

6. The navigation system of claim 1, where the monetary cost data includes a first monetary cost that depends on a vehicle characteristic.

7. The navigation system of claim 6, where the vehicle characteristic includes fuel consumption.

8. The navigation system of claim 1, where the monetary cost data includes a second monetary cost that depends on user-related data.

9. The navigation system of claim 1, where the monetary cost data includes a second monetary cost that depends on a route.

10. The navigation system of claim 9, where the second monetary cost include at least one of a road toll, a monetary cost of a vignette, a monetary cost of a ferry boat, a tunnel fee, or a monetary cost of a train.

11. The navigation system of claim 1, where a calculation module is further configured to determine a distance to the destination.

12. The navigation system of claim 1, where a calculation module is further configured to determine a plurality of monetary costs associated with the plurality of routes to the destination.

13. The navigation system of claim 12, further comprising a comparison module configured to compare the plurality of monetary costs.

14. The navigation system of claim 1, further comprising a network interface module in communication with the database system over a communication network.

15. The navigation system of claim 1, further comprising an input module configured to receive user-related data.

* * * * *